United States Patent [19]
Vandewater

[11] 3,906,903
[45] Sept. 23, 1975

[54] LIVESTOCK FEEDER
[76] Inventor: Lloyd L. Vandewater, R.R. No. 1, Dexter, Iowa 50070
[22] Filed: Jan. 11, 1974
[21] Appl. No.: 432,596

[52] U.S. Cl. ............................................. 119/60
[51] Int. Cl.² ............................................ A01K 5/00
[58] Field of Search ...................... 119/60, 58, 59

[56] References Cited
UNITED STATES PATENTS
| | | | |
|---|---|---|---|
| 1,319,060 | 10/1919 | Gardon | 119/60 |
| 3,020,881 | 2/1962 | Strom | 119/58 |
| 3,777,713 | 12/1973 | Deats | 119/60 |

*Primary Examiner*—Hugh R. Chamblee
*Attorney, Agent, or Firm*—Rudolph L. Lowell

[57] ABSTRACT

The feeder device is used in the feeding of large cylindrical shaped hay bales. The feeder is of a circular shape and size to form an enclosure which is positioned closely about an upright bale in open pasture. Circumferentially spaced feeding openings provide for a controlled access of cattle to the bale.

1 Claim, 4 Drawing Figures

LIVESTOCK FEEDER

SUMMARY OF THE INVENTION

The feeder device is of a simple and compact construction, economical in cost and provides for an efficient feeding of hay with a minimum of waste. The feeder device permits access of cattle to the hay within the confines thereof while preventing cattle from trampling on loose hay that has fallen to the ground around the bale. The feeder device is readily moved to various feeding stations by merely turning it on a side and then rolling the device along the ground.

DETAILED DESCRIPTION OF THE INVENTION

Figure 1:
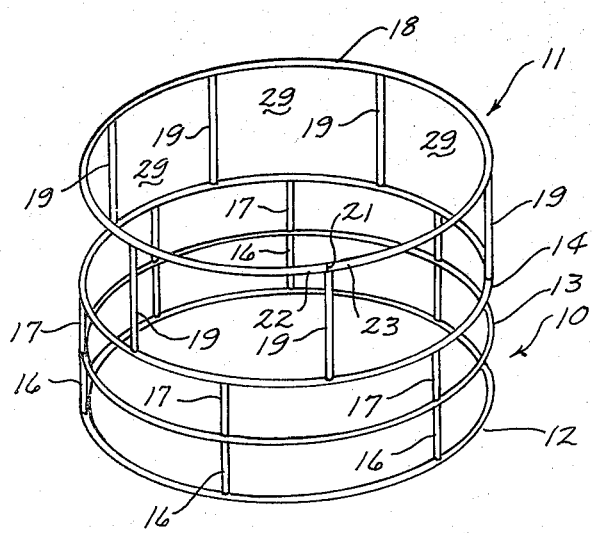
FIG. 1 is a perspective view of the feeder device of this invention.
Figure 3:
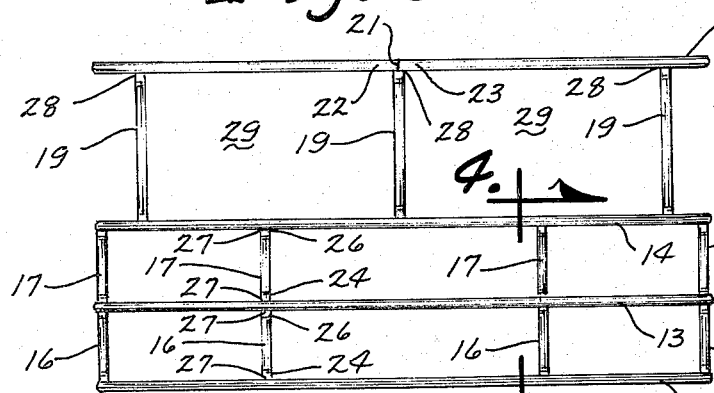
FIG. 3 is a side elevational view of the feeder device.

With reference to FIGS. 1 and 3 of the drawing, the feeder device of this invention is illustrated as including a ground supported base section 10 and an upper stall or feeding section 11. The base section 10 is comprised of a plurality of horizontal ring members 12, 13 and 14, which are vertically spaced equidistant from each other. The lowermost ring member 12 is ground supported and connected to the intermediate ring member 13 by a plurality of circumferentially spaced lower upright members 16, illustrated as six in number. In a like manner, the uppermost ring member 14 is connected to the intermediate ring member 13 by a second plurality of intermediate upright members 17 corresponding to and arranged in vertical alignment with the lower upright members 16.

Vertically spaced above the uppermost ring 14 of the base section 10 is a single horizontal ring member 18. This single ring member 18 is connected to the uppermost ring member 14 by a third plurality of circumferentially spaced top upright members 19, shown in FIGS. 1 and 3 as six in number. The top upright members 19 are arranged in a staggered relation with the intermediate upright members 17 so that a member 19 is located between each pair of adjacent ones of the members 17.

Figure 2:
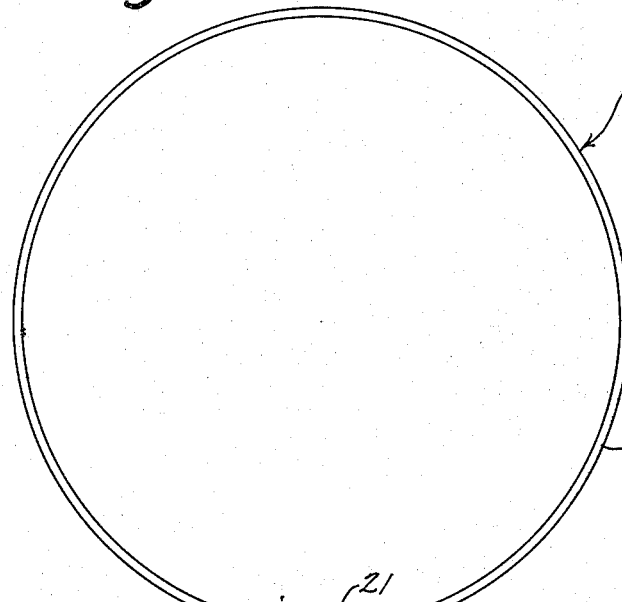
FIG. 2 is an enlarged top plan view of the device.

The feeder device is of an all tubular pipe construction with each of the ring members 12, 13, 14 and 18 being formed of a single length of pipe with the terminal ends thereof secured together by a weldment 21, as indicated for the terminal ends 22 and 23 of the ring member 18 (FIGS. 2 and 3).

Figure 4:
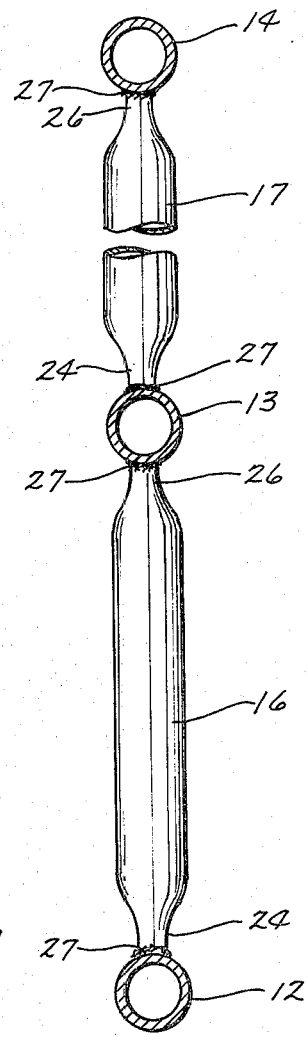
FIG. 4 is an enlarged sectional detail view as seen on line 4—4 in FIG. 3.

The upright connecting members 16 and 17 are of the like construction and size with each thereof formed of a single length of a tubular pipe having flat end portions 24 and 26 that are secured by weldments 27 to corresponding ring members, as shown best in FIG. 4. The top upright members 19 are constructed similarly to the members 16 and 17 but are of a longer length than the members 16 and 17. Each top upright member 10 is secured by weldments 28 to the ring members 14 and 18 (FIGS. 1 and 3).

In one embodiment of the invention each of the ring members 12, 13, 14 and 18 is formed of a 1 inch pipe material with a diameter of about 7 feet. The upright members 16, 17 and 19 are also formed on a 1 inch pipe material with the members 16 and 17 having a length of about nine inches and the members 19 a length of about eighteen inches so that the feeder device has an over-all height of about 40 inches. The upright members, in each plurality thereof, are circumferentially spaced a distance of about 44 inches from each other. It is seen, therefore, that the stall section 11, which includes the ring members 14 and 18 and the upright members 19, has six feed openings 29 (FIGS. 3 and 5) located above the base section 10 and of a size to readily admit therethrough the head and neck portion of a cow or steer.

Figure 5:
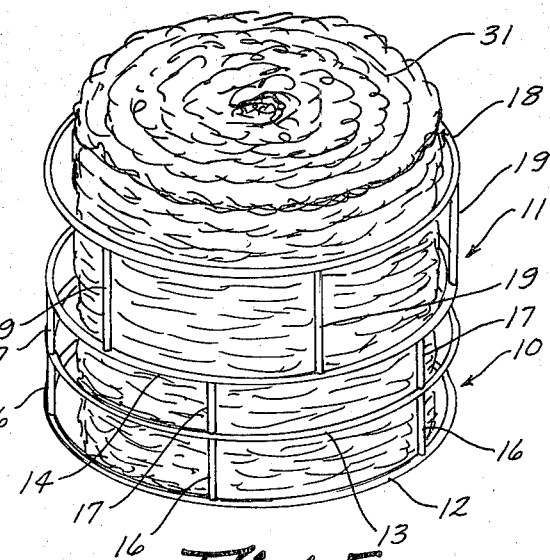
FIG. 5 is a perspective view of the feeder device shown in a feeding position relative to a bale of hay.

The feeder device is utilized particularly in the feeding of large cylindrical shaped bales of hay, one of which is indicated at 31 in FIG. 5. A bale 31 is generally about 6 feet in diameter, with a length of 5 feet or more and weighing from a 1,000 pounds to 1,500 pounds depending upon the bale density, namely, the compactness of the bale. The bale 31 is transported by commercially available bale transport devices to either a feeding pen or into an open pasture where it is turned on end so as to be in the upright position therefor shown in FIG. 5.

The feeder device is then slipped over the upright bale 31 so as to be ground supported in a closely adjacent concentric relation therewith. Cattle are thus permitted access to the bale 31 through the feed or stall openings 29. Any loose hay torn from the bale 31 and permitted to drop to the ground by feeding cattle is maintained within the confines of the base section 10. This loose hay is thus protected by the base section against being trampled under foot by the feeding cattle. Likewise, it will be apparent that regardless of the decreasing size of the bale 31 during a feeding operation the bale is prevented from being pushed over and spread over a large feed area as would occur if the bale was not enclosed. It will further be appreciated that when only remnants of the bale 31 remain in the feeder device, the device can be moved or pushed along the ground in an upright position by the feeding cattle so as to make all portions of the bale available for feeding through the openings 29.

To move the feeder device to a storage position, or to various feeding stations within an open pasture, it is only necessary to turn it on one side thereof in which position it can be readily pulled sidewise behind a tractor, or manually rolled along the ground.

Although the invention has been described with respect to a preferred embodiment thereof, it is to be understood that it is not to be so limited since changes and modifications can be made therein which are within the full intended scope of the invention as defined by the appended claims.

I claim:

1. A livestock feeder for feeding a large cylindrical shaped upright bale of hay comprising:

a. a plurality of horizontal ring members vertically spaced equal distances apart including a lowermost ground supported ring member, a middle ring member, and an uppermost ring member, b. first circumferentially spaced vertical members interconnecting said plurality of horizontal ring members, said first vertical members spaced equal distances apart and forming with said horizontal ring members first feeding openings, c. a single horizontal ring member vertically spaced above the uppermost one of said plurality of ring members a distance greater than the vertical distance between adjacent ones of said plurality of ring members, and d. other circumferentially spaced vertical members interconnecting said single ring member with said uppermost ring member to form a plurality of second feeding openings, said other vertical members being above and substantially centrally located between said first vertical members, e. all of said ring members being of like diameter to provide for the feeder being concentrically arranged about and adjacent to said bale.

* * * * *